(12) United States Patent
Fraser

(10) Patent No.: US 7,762,569 B2
(45) Date of Patent: Jul. 27, 2010

(54) CYCLE HAVING UNIQUE BALANCING CAPABILITIES

(76) Inventor: Douglas B. Fraser, 18035 Soledad Cyn. Rd. #58, Canyon Country, CA (US) 91387-3542

( * ) Notice: Subject to any disclaimer, the term of this patent is extended or adjusted under 35 U.S.C. 154(b) by 158 days.

(21) Appl. No.: 12/053,934

(22) Filed: Mar. 24, 2008

(65) Prior Publication Data

US 2009/0085320 A1 Apr. 2, 2009

Related U.S. Application Data

(60) Provisional application No. 60/995,486, filed on Sep. 27, 2007.

(51) Int. Cl.
*B62K 1/00* (2006.01)
(52) U.S. Cl. ...................... 280/205; 280/293
(58) Field of Classification Search .................. 280/205, 280/266, 288.4, 293
See application file for complete search history.

(56) References Cited

U.S. PATENT DOCUMENTS

| 402,313 | A | | 4/1889 | Duryea |
| 422,548 | A | | 3/1890 | Thomas |
| D273,287 | S | * | 4/1984 | Evans .................. D12/107 |
| 4,657,272 | A | * | 4/1987 | Davenport ............. 280/266 |
| 5,454,579 | A | * | 10/1995 | Chen ................... 280/205 |
| 5,464,271 | A | | 11/1995 | McFarland |
| 6,581,949 | B2 | | 6/2003 | Lopez |
| 6,666,469 | B2 | * | 12/2003 | Yu et al. .............. 280/274 |
| 7,144,029 | B1 | | 12/2006 | Heady |
| 7,261,310 | B2 | | 8/2007 | Yifrah et al. |
| 2005/0093348 | A1 | | 5/2005 | Heady |

\* cited by examiner

*Primary Examiner*—Tony H. Winner

(57) ABSTRACT

A cycle is disclosed that has at least one wheel with an axle rotatably mounted to a pair of opposing support plates. A seat is mounted to an upper end of an inverted Y-shaped seat support frame that includes two lower ends each pivotally mounted at a seat pivot to one of the support plates. A handlebar is mechanically coupled to each support plate with the handlebar being forward of the axle. In use, a user may balance on the cycle by manipulating the distance between the handlebar and the seat, facilitating the fine adjustment of the center of gravity of the cycle over the wheel.

10 Claims, 4 Drawing Sheets

CYCLE HAVING UNIQUE BALANCING CAPABILITIES

CROSS-REFERENCE TO RELATED APPLICATIONS

This application claims the benefit of U.S. Provisional Patent Application 60/995,486, filed on Sep. 27, 2007 and incorporated herein by reference.

STATEMENT REGARDING FEDERALLY SPONSORED RESEARCH AND DEVELOPMENT

Not Applicable.

FIELD OF THE INVENTION

This invention relates to cycles, and more particularly to cycles with improved steering, maneuverability, and balancing.

DISCUSSION OF RELATED ART

Various types of cycles are known in the art, these including both bicycles and unicycles. When performing a "wheelie" with a bicycle, that is, when balancing on just the rear wheel with the front wheel off of the ground, a bicycle has many of the same challenges as does a unicycle. The principal challenge is maintaining the center of gravity either directly over or just in front of the axle of the operative wheel. Further, when riding a bicycle in the conventional manner, the closer the center of gravity of the cycle is to the rear wheel the easier it is to steer the bicycle since the rear wheel more easily pivots.

Various prior art cycles include seats that are pivotally fixed to a bicycle frame or a wheel. For example, U.S. Pat. No. 402,313 to Duryea on Apr. 30, 1889, teaches such a device. However, such a device does not facilitate steering but rather peddling, as the seat pivots proximate the pedal crank-axle (pg. 3, lines 70-80), not above the rear wheel. U.S. Pat. No. 7,261,310 to Yifrah et al. on Aug. 28, 2007 has similar characteristics.

U.S. Pat. No. 422,548 to Thomas on Mar. 4, 1890, teaches a bicycle with a seat attached to a pivoting support, but the support pivots well between the front and rear wheels. Such a device does not facilitate the adjustment of the center of gravity over the rear wheel, and therefore does not facilitate turning of the bicycle or balancing of the bicycle on the rear wheel.

U.S. Pat. No. 6,581,949 to Lopez on Jun. 24, 2003, teaches a seat supported on a pivoting seat support member, but the seat support member is pivoted on the bicycle frame closer to the front wheel than the rear, and thus this device has similar constrains as the -548 device.

U.S. Patent Application 2005/0093348 to Heady on May 5, 2005; U.S. Pat. No. 5,464,271 to McFarland on Nov. 7, 1995; and U.S. Pat. No. 7,144,029 to Heady on Dec. 5, 2006 all disclose pivoting seat arrangements that do not substantially alter the center of gravity of the cycle to which such devices are mounted. These devices, rather, are used more for absorbing shock and allowing comfortable seat positioning rather than shifting the center of gravity over the rear wheel of the bicycle to facilitate turning and balancing thereof.

Unicycles, by their nature, require the user to be substantially balanced over the wheel, but no provision has been made in prior art devices to facilitate the continuous adjustment of the center of gravity over the wheel with a handlebar. While unicycles having handles are also known in the art, such as, for example, U.S. Pat. No. 5,868,413 issued to Cabrera on Feb. 9, 1999, such devices do not allow for fine adjustment of the center of gravity over the wheel.

U.S. Pat. No. 550,399 and U.S. Pat. No. 550,400, both to Anderson on Nov. 26, 1895, teach a unicycle with a lever arm that adjusts the positioning of additional wheels for stabilizing the unicycle or applying a braking force to a unicycle. Such devices teach that the seat must be attached to a pivot point well below the axle of the wheel, and such device provide a lever for fine adjustment of the center of gravity with respect to the axle. Such devices, however, are not sell suited for coarse adjustment of the center of gravity with respect to the axle, and such device result in a crank-axle being below the wheel axle and coupled through a gear mechanism to the wheel. Thus such devices are unnecessarily complicated and provide limited ability to affect the center of gravity of the rider over the wheel of such devices.

Therefore, there is a need for a cycle device that facilitates adjusting the center of gravity of the rider and cycle with respect to the operative wheel of the cycle. Such a needed device would facilitate the balancing of the rider over the wheel of a unicycle or of the rider of a rear wheel of a bicycle in order to make steering and riding of the cycle easier. Such a needed invention would also be relatively simple in construction, and provide options for additional stability for inexperienced riders. The present invention accomplishes these objectives.

SUMMARY OF THE INVENTION

The present device is a cycle that has at least one wheel with an axle rotatably mounted on either side of the wheel to a pair of support plates. The cycle may be a bicycle, a unicycle, or the like. As a bicycle, the wheel is a rear wheel and an additional forward wheel is rotationally coupled to the handlebar for steering. The handlebar is rotationally captured by a bicycle frame, and each support plate is fixed to the bicycle frame at the rear wheel axle. Preferably, the handlebar is also pivotally fixed to an upper end of a handlebar post that terminates in a front wheel fork at a lower end thereof. The handlebar is thus both rotatable in a clockwise and counter-clockwise direction in plan view, and also pivotable in a forward direction and a backward direction.

A seat is mounted to an upper end of an inverted Y-shaped seat support frame that includes two lower ends each pivotally mounted at a seat pivot to one of the support plates. A handlebar is mechanically coupled to each support plate with the handlebar being forward of the axle.

The present invention is a cycle device that facilitates adjusting the center of gravity of the rider and cycle with respect to the operative wheel thereof. The present device facilitates the balancing of the rider over the wheel of a unicycle or of the rider of a rear wheel of a bicycle in order to make steering and riding of the cycle easier. The present invention is also relatively simple in construction, and provide options for additional stability for inexperienced riders. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
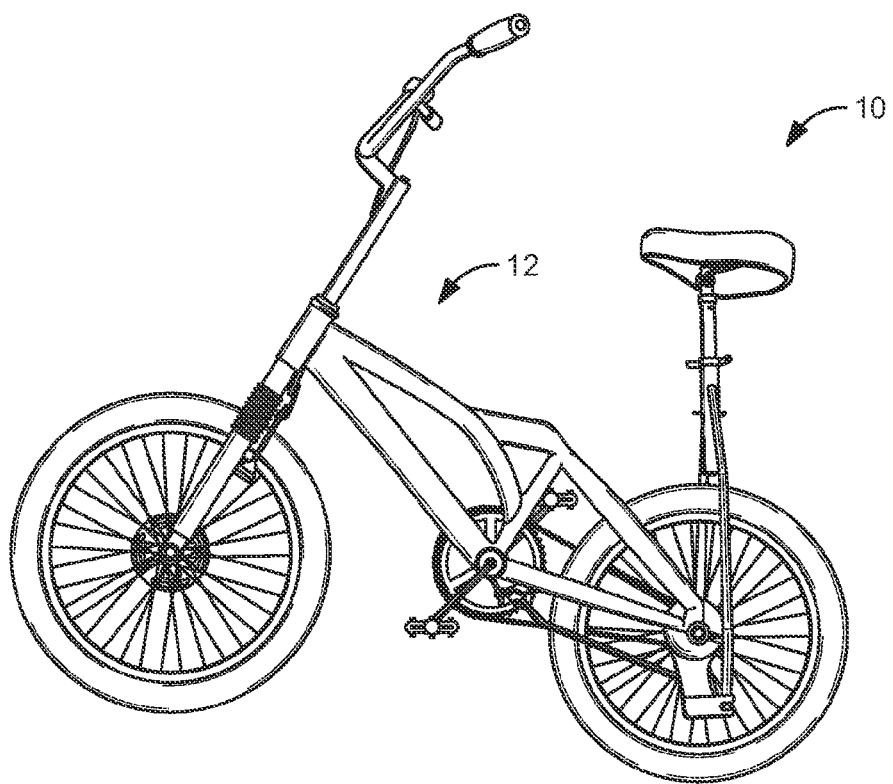
FIG. 1 is a left-side elevational view of the invention, illustrating a bicycle embodiment thereof.
Figure 2:
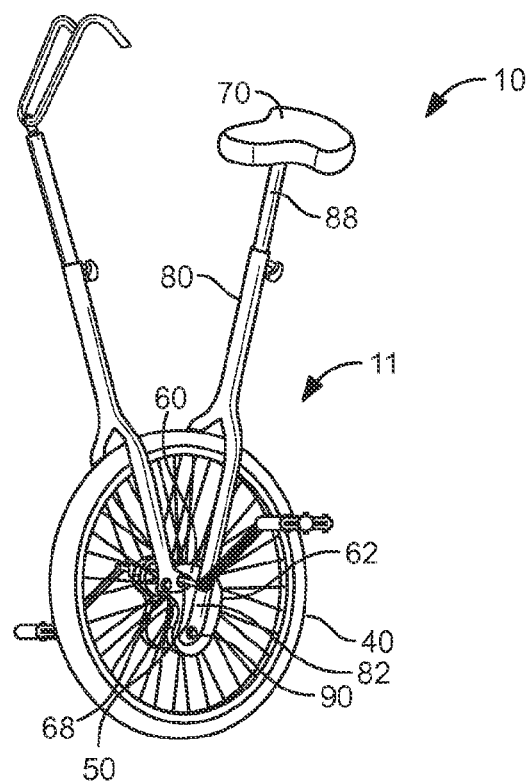
FIG. 2 is a perspective view of the invention, illustrating a unicycle embodiment thereof.
Figure 3:
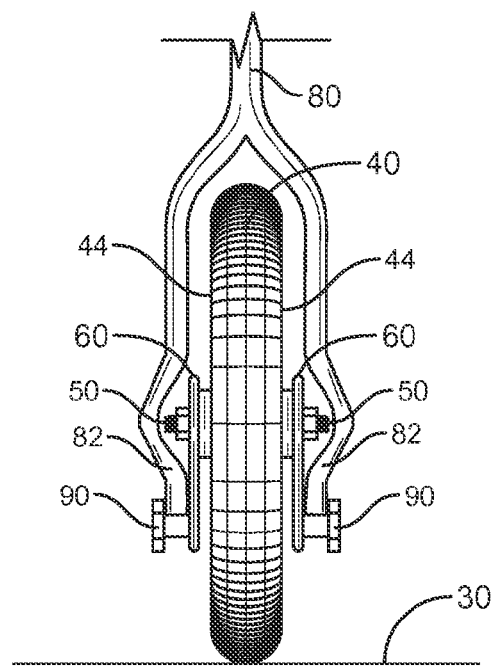
FIG. 3 is a partial rear view of the invention, illustrating a back tire and a seat support frame fixed to a pair of support plates.

FIGS. 1 and 2 illustrate alternate embodiments of a cycle 10. A user 20 rides the cycle 10 on a surface 30, such as a ground surface (FIG. 3). The cycle 10 has at least one wheel 40 with an axle 50 rotatably mounted on either side 44 of the wheel 40 to a pair of support plates 60 (FIG. 3). Each support plate 60 has a forward side 68 and a rear side 62. The cycle 10 in FIG. 1 is a bicycle 12, and the cycle 11 in FIG. 2 is a unicycle. Other embodiments, such as a tricycle (not shown), may also be used with the present invention. Each support plate 60 is preferably made as a relatively thin, flat metal plate. The wheel 40 is preferably a conventional bicycle wheel, or the like.

Figure 4:
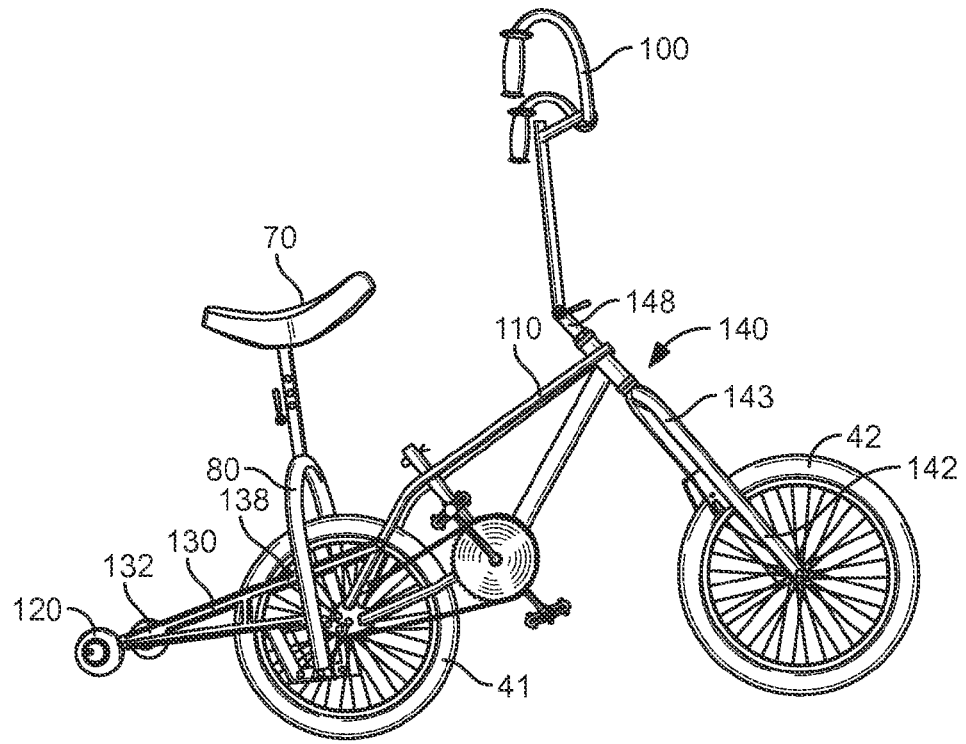
FIG. 4 is a right-side elevational view of the invention, illustrating an embodiment having a pair of wheelie safety wheels fixed to a wheelie wheel support frame.
Figure 5:
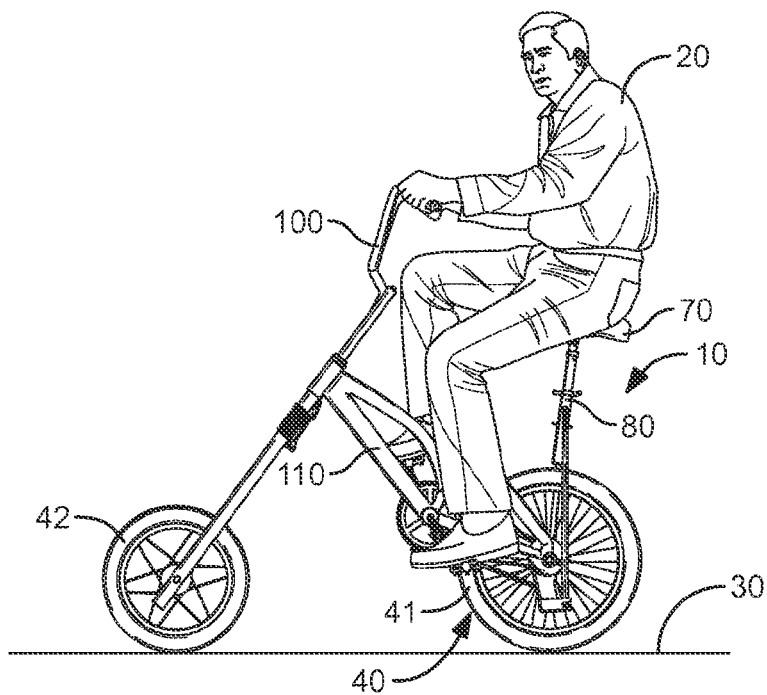
FIG. 5 is a left-side elevational view of the invention, illustrated in use.
Figure 6:
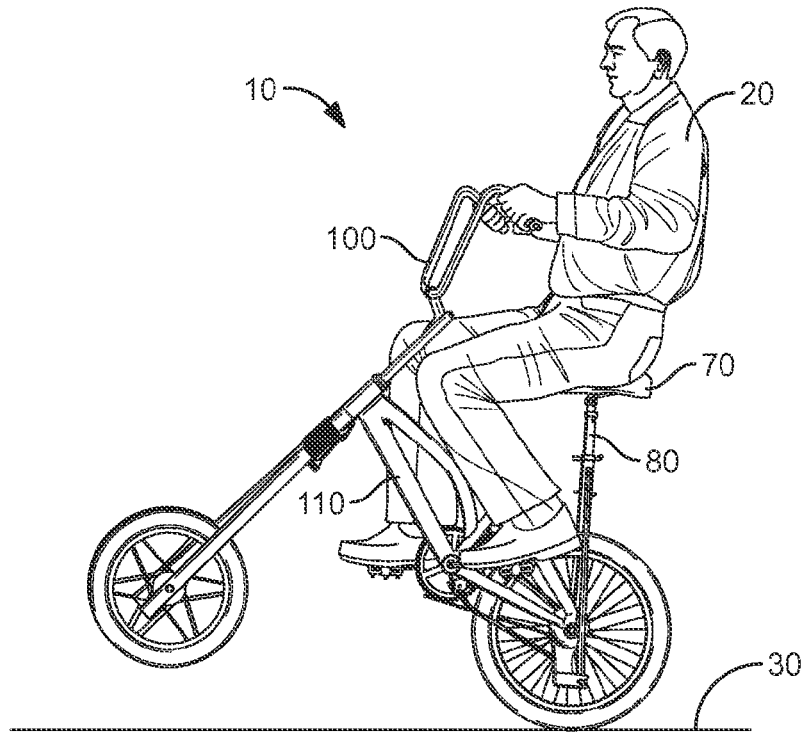
FIG. 6 is a left-side elevational view of the invention, illustrated in use with a user performing a wheelie.

FIGS. 1, 5, and 6 illustrate the bicycle 12 embodiment wherein the wheel 40 is a rear wheel 41 and wherein the cycle 10 includes a forward wheel 42 rotationally coupled to the handlebar 100 for steering of the bicycle 12. The handlebar 100 is rotationally captured by a bicycle frame 110, and each support plate 60 is fixed to the bicycle frame 110 at the rear wheel axle 50. Preferably, the handlebar 100 is also pivotally and selectively fixed to an upper end 148 of a handlebar post 140 that terminates in a front wheel fork 143 at a lower end 142 thereof. The handlebar 100 is thus both rotatable in a clockwise and counter-clockwise direction in plan view, and also pivotable in a forward direction 150 and a backward direction 160 (FIG. 4) so that the rider may fix the handlebar 100 in a comfortable position before riding. The handlebar 100 is preferably tubular metal stock, as is known in the art. Further, the bicycle frame 110 is also made from a metal tube stock or the like.

Figure 7:
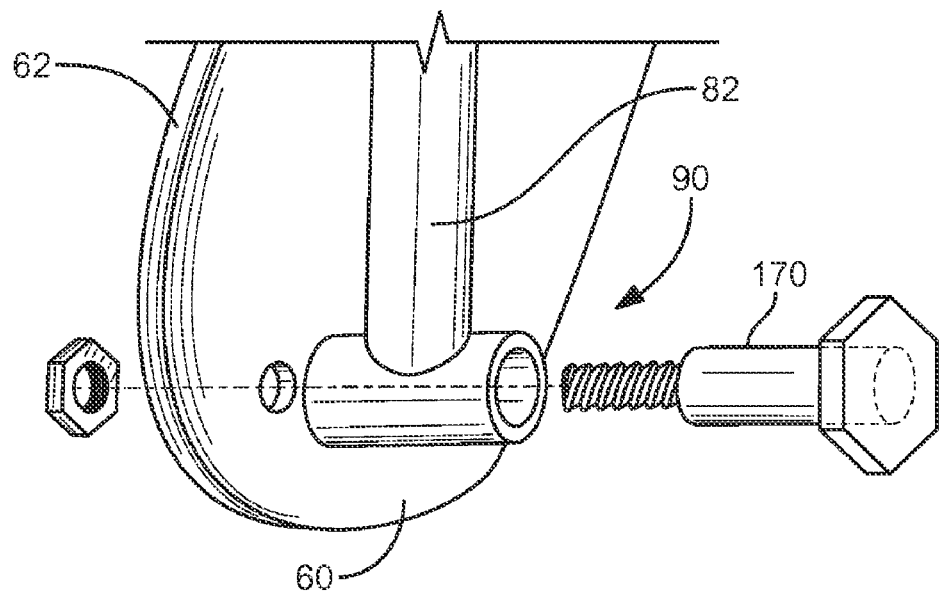
FIG. 7 is a partial perspective exploded view of a support plate of the invention, illustrating an axle bolt pivotally fixing the seat support frame thereto.

A seat 70 is mounted to an upper end 88 of an inverted Y-shaped seat support frame 80. The support frame 80 includes two lower ends 82 each pivotally mounted at a seat pivot 90, such as an axle bolt 170, to one of the support plates 60 between the rear side 62 thereof and the axle 50 (FIG. 7). Preferably the seat 70 is telescopically and selectively adjustable in height with respect to the seat support frame 80. Further, the seat support frame 80 bends outwardly proximate the two lower ends 82 thereof so that as the seat support frame 80 pivots past the axle 50 it does not contact the axle 50 or bolts securing the axle 50 to the support plates 60 (FIG. 3).

A handlebar 100 is mechanically coupled to each support plate 60 with the handlebar 100 being forward of the axle 50. In the embodiment wherein the cycle 10 is a unicycle 11, the handlebar 100 is fixed directly to each support plate 60 (FIG. 2). Alternately, in the embodiment wherein the cycle 10 is a bicycle 12, the handlebar 100 is fixed to each support plate 60 indirectly through the bicycle frame 110. In any embodiment, however, the handlebar 100 is positioned forward of the axle 50.

In use, the user 20 may balance on the cycle 10 by manipulating the distance between the handlebar 100 and the seat 70 while riding on the surface 30, the present invention facilitating the fine adjustment of the center of gravity of the cycle 10 over the wheel 40. Further, the user 20 may easily balance on the wheel 40 or the rear wheel 41 by adjusting the center of gravity of the cycle 10 through manipulation of the distance between the handlebar 100 and the seat 70.

At least one wheelie safety wheel 120 may be rotationally captured at a rear end 132 of a wheelie wheel support frame 130 (FIG. 4). A front end 138 of the wheelie wheel support frame 130 is fixed to the seat support frame 80 between the lower end 82 and upper end 88 thereof. As such, when the user 20 is balancing on the rear wheel 41 the wheelie safety wheel 120 may contact the surface 30 to help stabilize the cycle 10 on the wheel 41 until the user 20 can readjust the center-of-gravity of the cycle 10 either directly over or just forward of the rear wheel 41.

Figure 8:
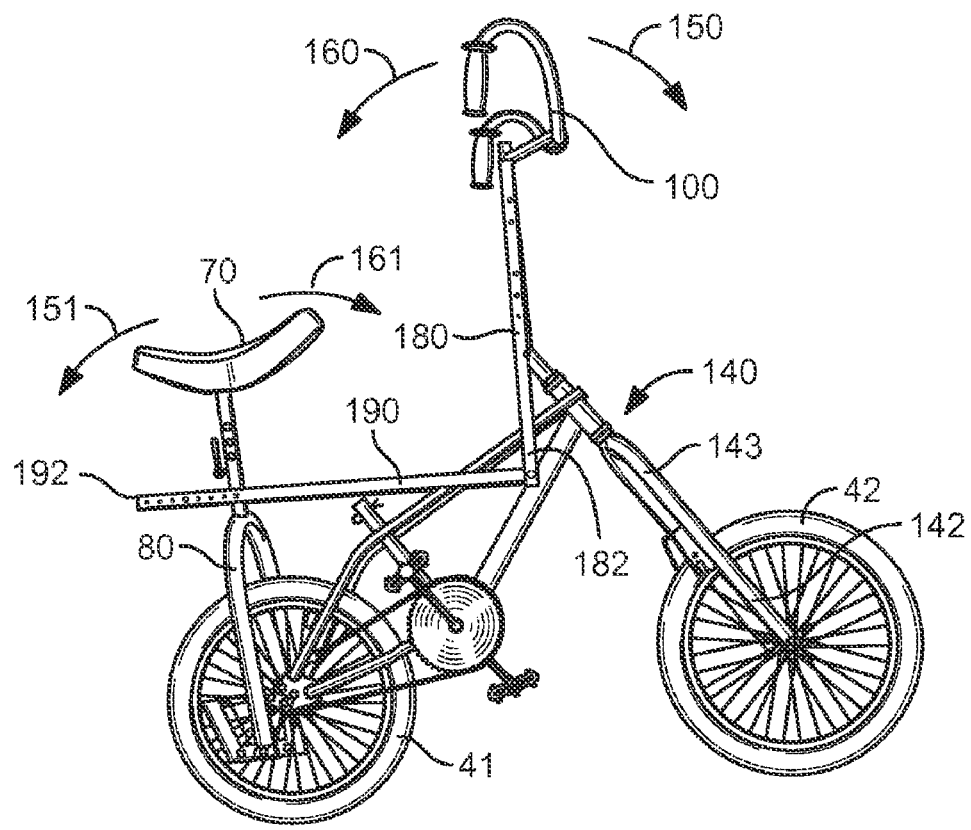
FIG. 8 is a perspective illustration of an alternate embodiment of the invention having a handlebar extension and a seat extension.

In an alternate embodiment of the invention, illustrated in FIG. 8, a handlebar extension 180 is fixed to the handlebar 100 and projects downwardly therefrom to a lower end 182 thereof. The lower end 182 is pivotally connected to a forward end 198 of a seat extension 190 that is fixed at a rear end 192 thereof to the seat support frame 80. As such, when the user 20 pulls the handlebar 100 back in the backward direction 160, the seat support frame 80 is pulled forward in a seat forward direction 161. Alternately, when the user pushes the handlebar 100 forward in the forward direction 150, the seat support frame 80 is pushed backward in a seat backward direction 151. Such action allows the user 20 to more easily balance on the rear wheel 41 while lifting the forward wheel 42 off of the surface 30 while riding. Both the handlebar extension 180 and the seat extension 190 are preferably made from an elongated and rigid material, such as flat metal rod stock.

While a particular form of the invention has been illustrated and described, it will be apparent that various modifications can be made without departing from the spirit and scope of the invention. For example, the shape of the seat extension 80 and the handlebar 100 may take a variety of aesthetically varying forms. Accordingly, it is not intended that the invention be limited, except as by the appended claims.

What is claimed is:

1. A bicycle comprising:
  a. a front wheel and a front fork;
  b. a rear wheel including an axle;
  c. a pair of support plates, wherein each support plate having a forward side and a rear side, wherein the plates are connected to the axle;
  d. a main frame including a first connection and a second connection;
  e. wherein said first connection is pivotally connected to the front fork and said second connection connected to said axle; and
  f. a seat mounted to an upper end of an inverted Y-shaped seat support frame, the support frame including two lower ends each pivotally mounted at a seat pivot to one of the support plates at the rear side thereof.

2. The bicycle of claim 1 wherein a handlebar is coupled to the front fork for steering the bicycle.

3. The cycle of claim 1 further including at least one wheelie safety wheel rotationally captured at a rear end of a wheelie wheel support frame, a front end thereof fixed to the main frame.

4. The bicycle of claim 1 wherein the handlebar is pivotally fixed to an upper end of a handlebar post that terminates in the front fork at a lower end thereof, the handlebar being both rotatable in clockwise and counter-clockwise directions, and pivotable in forward and backward directions.

5. The bicycle of claim 1 wherein each seat pivot is an axle bolt.

6. The cycle of claim 1 wherein the seat support frame is telescopically and selectively adjustable in height.

7. The cycle of claim 4 further including a handlebar extension fixed to the handlebar and projecting downwardly therefrom to a lower end, the lower end pivotally connected to a forward end of a seat extension fixed to the seat support frame at a rear end thereof, such that when the handlebar is pulled back the seat support frame is pulled forward, and such that when the handlebar is pushed forward the seat support frame is pushed backward.

8. A cycle for a user to ride on a surface, said cycle comprising:
   a. least one wheel having an axle, the axle rotatably mounted on either side of the wheel to a pair of support plates, each support plate having a forward side and a rear side;
   b. a seat mounted to an upper end of an inverted Y-shaped seat support frame, the support frame including two lower ends each pivotally mounted at a seat pivot to one of the support plates between at the rear side thereof;
   c. a handlebar directly coupled to the forward side of the support plates and being forward of the axle; and
   d. wherein the user may balance the cycle by manipulating the distance between the handlebar and the seat while riding on the surface.

9. The cycle of claim 8, wherein the cycle is a unicycle.

10. The bicycle of claim 8 wherein said seat pivot is an axle bolt.

\* \* \* \* \*